United States Patent [19] [11] 4,398,580

Sohn et al. [45] Aug. 16, 1983

[54] VENEER LATHE LOG CHARGER SYSTEM HAVING ENHANCED ACCURACY AND RATE OF PRODUCTION

[75] Inventors: Fred Sohn, Roseburg; Kenneth L. Shrum, Glide, both of Oreg.

[73] Assignee: Sun Studs, Inc., Roseburg, Oreg.

[21] Appl. No.: 267,796

[22] Filed: May 28, 1981

[51] Int. Cl.[3] .......................... B27L 5/02; G01B 9/02

[52] U.S. Cl. .............................. 144/357; 144/209 A; 250/560; 364/564

[58] Field of Search ............... 144/209 R, 209 A, 357; 250/560; 364/474, 475, 550, 563, 564

[56] References Cited

U.S. PATENT DOCUMENTS

| | | | |
|---|---|---|---|
| 3,037,538 | 6/1962 | Graham | 144/209 A |
| 3,664,395 | 5/1972 | Reed | 144/209 A |
| 3,736,968 | 6/1973 | Mason | 144/357 |
| 3,752,201 | 8/1973 | Heth | 144/209 A |
| 3,787,700 | 1/1974 | Chasson | 250/560 |
| 3,852,579 | 12/1974 | Sohn et al. | 144/357 X |
| 3,890,509 | 6/1975 | Maxey | 144/357 |
| 3,902,539 | 9/1975 | Ketteler | 144/209 A |
| 3,992,615 | 11/1976 | Bennett et al. | 144/209 R |
| 4,197,888 | 4/1980 | McGee et al. | 144/209 A |
| 4,221,973 | 9/1980 | Nosler | 250/560 |
| 4,246,940 | 1/1981 | Edwards et al. | 144/209 A |
| 4,335,763 | 6/1982 | McGee | 144/209 A |

*Primary Examiner*—W. D. Bray
*Attorney, Agent, or Firm*—Chernoff, Vilhauer, McClung, Birdwell & Stenzel

[57] ABSTRACT

A veneer lathe charger system utilizing automated equipment for scanning and positioning a log to obtain optimum production of veneer therefrom. The charger has mechanical features specially designed to provide a degree of accuracy in the physical manipulation of the log comparable to the degree of accuracy provided by the automated scanning and positioning equipment. These include log manipulation features emphasizing engagement of the log only at its opposing ends during and after scanning and especially during transfer from one manipulating device to another, avoidance of end engagement by two different manipulating devices in identical end areas of the log, minimal movement of log positioning devices by the employment of dual scanning steps and features for retaining the accuracy of the manipulation devices despite wear thereof. The charger further includes features for improving its rate of production by reducing time delays between successive log manipulating steps.

11 Claims, 13 Drawing Figures

VENEER LATHE LOG CHARGER SYSTEM HAVING ENHANCED ACCURACY AND RATE OF PRODUCTION

BACKGROUND OF THE INVENTION

This invention relates to improvements in log charger systems for veneer lathes. More particularly the invention relates to improvements in such charger systems having automated scanning equipment for sensing the shape of a log and positioning the log for optimum production of veneer.

In the design of veneer production equipment, the primary objectives are to maximize the yield of usable veneer from the irregularly-shaped logs from which the veneer is peeled, and to maximize the production rate of the veneer. In order to attain these objectives great effort has been expended in the development of sophisticated, automated log scanning equipment, primarily of the electro-optical type, for sensing the shape of each log and rapidly determining its longitudinal axis for optimum veneer production. Examples of such scanning systems used or usable for this purpose are contained in the following U.S. Pat. Nos.: 3,736,968; 3,746,065; 3,787,700; 3,852,579; 3,890,509; 3,902,539; 3,992,615; 4,197,888; and 4,221,973. Electro-optical scanners constructed in accordance with the foregoing technology, and particularly those which rotate the log during the scanning process, are extremely accurate and have the capability of determining the location of the log axis for optimum veneer production to within a few thousandths of an inch.

While such a high degree of accuracy in determining the optimum peeling axis should theoretically maximize the yield of veneer from each log, the results obtainable in practice have unfortunately fallen short of this goal because the mechanical log manipulators of veneer lathe chargers are incapable of duplicating the scanner's degree of accuracy. Thus, although the scanning system may identify the location of the optimum peeling axis of a log to within a few thousandths of an inch, the mechanical log manipulators responsible for aligning such axis with the rotational axis of the lathe actually allow a much wider margin for error than that tolerated by the scanning system. Because of this descrepancy in tolerances between the electro-optical and mechanical portions of veneer lathe chargers, substantial mispositioning of the logs and less than optimum yields persist despite the provision of the highly accurate scanning systems.

The process of log manipulating mechanisms, as opposed to scanning systems, in veneer lathe chargers is exemplified by U.S. Pat. Nos. 3,037,538, 3,664,395, 3,746,065, 3,752,201, 4,197,888 and 4,246,940. In general, all of such chargers attempt to hold the log at either a prepositioning or a scanning station to determine its optimum peeling axis, adjust the position of the log such that the optimum axis is aligned with a reference axis, and transfer the log to the veneer lathe such that the optimum axis is aligned with the rotational axis of the lathe. In these few mechanical steps, however, there are many opportunities for log positioning errors. Relatively large errors can occur, for example, if at any point from the initiation of scanning to the securing of the log in the lathe, the log is supported by engagement with its curved surfaces at points intermediate its ends, rather than by end engagement. Surface engagement allows variation of log position due to surface irregularities or differences in resistance to compressive forces along the surface area, either of which can shift the position of the log transverse to its optimum axis and thereby cause significant error in the final alignment of the optimum axis relative to the veneer lathe. If scanning is not used the optimum axis is determined from insufficient and inaccurate information regarding the log's profile. But even if highly accurate end-engaging and electro-optical scanning techniques are employed, another problem conducive to log-positioning errors remains due to the large degree of adjusting motion required to align the determined optimum peeling axis of the log with the reference axis. Because present modern chargers attempt to perform all necessary log position adjustments pursuant to a single scanning step, the position adjusting mechanism must often travel distances which are too great to permit fine adjustment as a practical matter.

SUMMARY OF THE PRESENT INVENTION

The present invention is directed to an improved veneer lathe charger system which significantly reduces the above-mentioned mechanical inaccuracies of previous veneer lathe chargers.

Extremely fine alignment of the optimum peeling axis of a log in response to the scanner is made possible by the employment of a second scanning system which precedes the final scanning system and preliminarily determines the optimum peeling axis of the log so that the log can be loaded into the final scanner with its true optimum axis very nearly in proper alignment with the reference axis. This enables the final scanner and its related log positioning mechanism to make only small adjustments to the log's position prior to transferring the log to the veneer lathe, requiring movements of only minimal distances and thereby enabling an extremely high degree of accuracy.

Accordingly, it is a principal objective of the present invention to improve the mechanical accuracy of a veneer lathe charger to a degree where its accuracy in physically manipulating logs is more commensurate with the accuracy of existing automated scanning systems, so as to increase the yield from each log.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

General Arrangement

Figures 1, 3, 4:
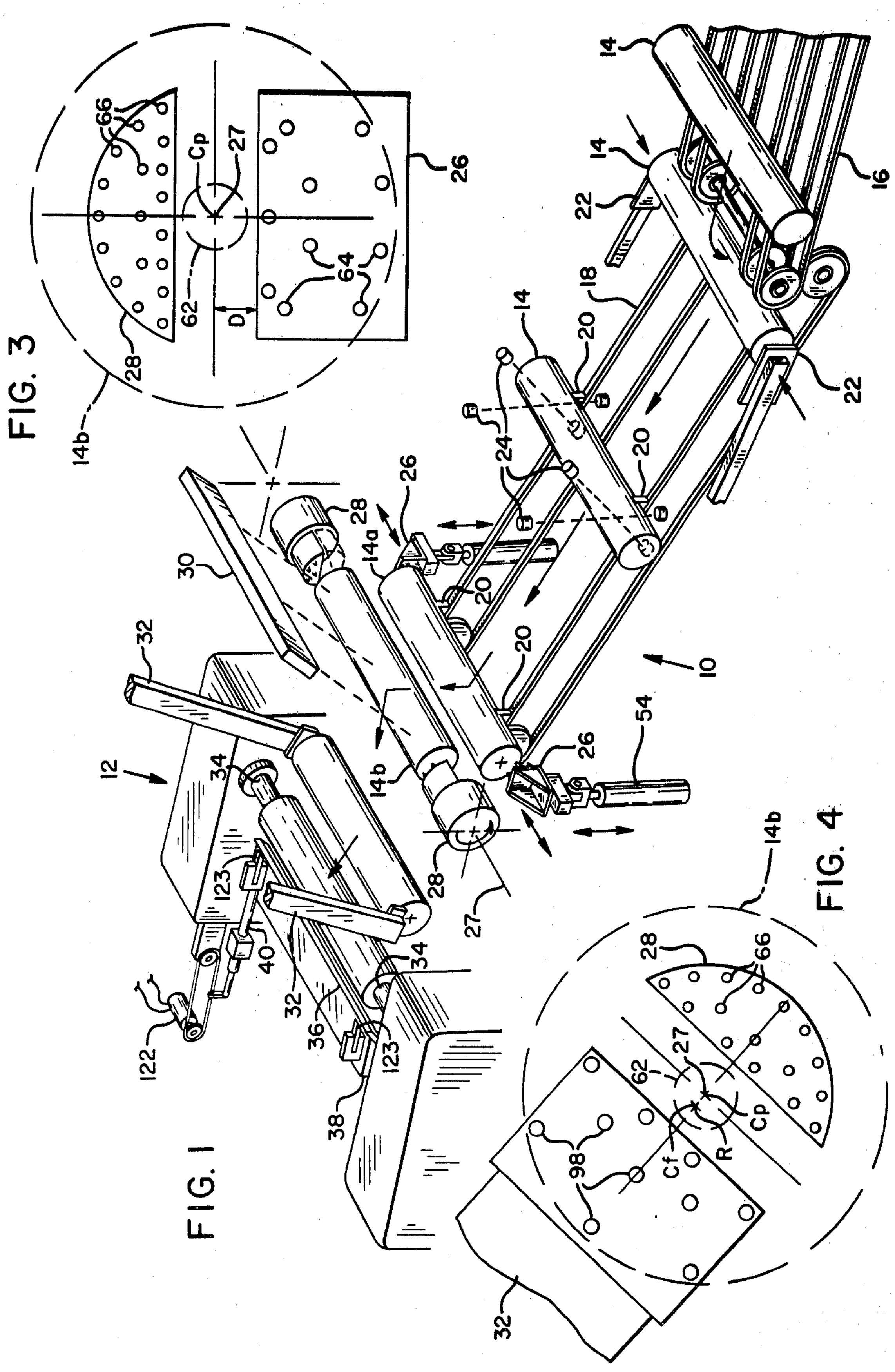
FIG. 1 is a simplified perspective view of the major elements of the preferred veneer lathe charger and its associated lathe in accordance with the principles of the present invention.
FIG. 3 is an enlarged end view of an exemplary log showing the relationship between the end-engaging element of a rotary log scanner spindle of the present invention and that of its associated loading device.
FIG. 4 is an enlarged end view of an exemplary log showing the relationship between the end-engaging element of a rotary log scanner spindle of the present invention and that of its associated log transfer device.
Figure 2:
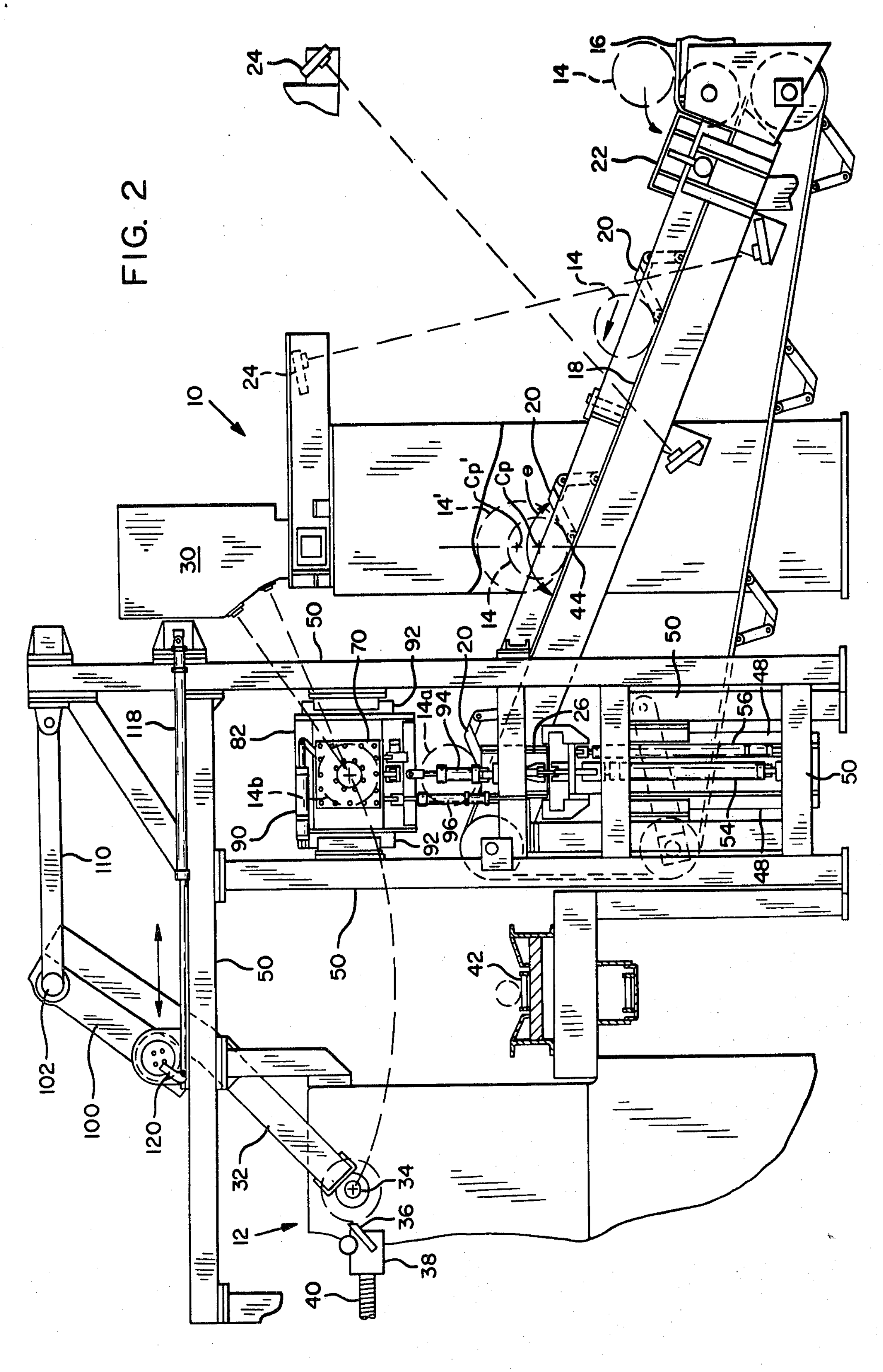
FIG. 2 is more detailed side view of the apparatus of FIG. 1.

FIG. 1 depicts schematically, and FIG. 2 shows in greater detail, the preferred general arrangement of the veneer lathe charger, indicated generally as 10, with respect to the veneer lathe, indicated generally as 12. Successive logs 14 approach the charger 10 on a conveyer 16, from which they are deposited onto an upwardly sloped conveyer 18 having successive sets of spaced lugs 20 which position the logs at predetermined intervals along the conveyer 18. Arms 22 position each log 14 longitudinally on the conveyer 18 and sense its length. As the logs 14 proceed up the conveyer 18, they pass through a preliminary scanner 24, to be described in greater detail hereafter, which roughly senses the shape of each log and thereby determines the location of a preliminary optimum peeling axis of the log. The log 14 proceeds past the scanner 24 to a station indicated by the position of log 14*a* where the conveyer stops momentarily. A pair of log-engaging devices 26 engage the opposing ends of the log at this point and raise the log upwardly to a position, indicated by log 14*b*, wherein the preliminary optimum peeling axis of the log, as determined by the preliminary scanner 24, is aligned with the rotational axis 27 of a pair of rotary spindles 28 which engage the opposing ends of the log. The rotary spindles 28 rotate the log through a complete revolution while a rotary final scanner 30 senses the log's shape so as to determine the precise location of the optimum peeling axis of the log. The rotary spindles 28 are then adjusted horizontally and vertically so as to align the optimum peeling axis, as determined by the final scanner 30, with a predetermined reference axis. While such adjusting is taking place, the spindles 28 further rotate the log to a position where it can be engaged by a pair of end-engaging transfer arms 32 which then transfer the log from the spindles 28 to the spindles 34 of the veneer lathe 12 such that the optimum peeling axis of the log is aligned with the rotational axis of the lathe 12. The veneer lathe 12 includes a peeling knife 36 mounted on a carriage 38 which is reciprocated toward and away from the rotational axis of the veneer lathe by ball screws such as 40. Peeling of the log occurs as the knife 36 is advanced toward the rotational axis of the lathe and, when the log has been reduced by peeling to a predetermined diameter, the knife 36 is retracted and the remnant of the log is released from the lathe spindles 34 and ejected transversely by a conveyer 42 (FIG. 2).

Preliminary Scanning

Preliminary scanning of a log 14 takes place as it travels up conveyer 18 past scanner 24. Scanner 24 is a computerized electro-optical scanner of any suitable known type, such as those shown in U.S. Pat. Nos. 3,736,968, 3,746,065 or 3,890,509, the disclosures of which are incorporated herein by reference. Preliminary scanner 24 determines the profile dimensions of the log 14 with respect to two planes intersecting the ends of the log, and is thereby able to compute a preliminary optimum peeling axis of the log in a manner already well-known to the art. It should be noted that, although electro-optical scanning techniques are preferred for use in the present invention, other types of scanners which likewise are capable of sensing the shape of a log, such as sonic or air scanners, are not foreclosed.

In FIG. 2, the location of one end of the preliminary optimum peeling axis $C_p$ (as determined by the preliminary scanner 24) of a relatively small diameter log 14 is shown. The different location of the end of the preliminary optimum peeling axis $C_p'$ of a much larger diameter log 14' is also shown for purposes of comparison. Although the two axes $C_p$ and $C_p'$ are at different elevations relative to the sloped conveyer 18, it will be noted that they are substantially aligned vertically. This is because conveyer 18 is constructed such that its acute forward angle of slope is the same as the acute rearward angle of slope of the log-engaging faces of the lugs 20. Thus the locations of the preliminary optimum peeling axes of different diameter logs supported by the V-shaped supporting surfaces formed by the lugs 20 and conveyer 18 do not vary horizontally with respect to the junction point 44 between the conveyer and the lugs merely because of diameter differences. Rather horizontal variations in optimum axis location will occur only due to log profile irregularities, and therefore such variations will be of lesser magnitude than if they were affected by differing diameters.

When the log arrives at position 14*a* adjacent the log-engaging devices 26, the conveyer stops momentarily with the junction point 44 in a predetermined relation to the devices 26. Each log-engaging device 26 is mounted on a vertically oriented slide 48 (FIG. 12) slidably mounted to the frame 50 of the charger 10. The slide 48 permits each log-engaging device 26 to be moved vertically along a rectilinear path which bisects the included angle $\theta$ between the conveyer 18 and the log-engaging surfaces of the lugs 20. Each log-engaging device 26 is also extensible and retractable toward or away from the end of the log by virtue of a horizontal slide 52 which is mounted in the head of the slide 48. Vertical motion of the log-engaging device 26 is controlled by a double-acting hydraulic ram assembly 54 in response to a servo valve and controller (not shown) receiving continuous vertical position-sensing feedback information from a position sensor 56 in a manner to be described more fully hereafter. Horizontal extension and retraction of the log-engaging device 26 is likewise controlled by a double-acting hydraulic ram assembly 58 in response to a valve and controller (not shown) receiving horizontal position feedback information from a position sensor 60.

As each respective log approaches position 14*a* the controller of ram assemblies 54, in response to the height of the preliminary optimum peeling axis determined by the preliminary scanner 24, vertically adjusts the height of each respective log-engaging device 26 individually such that the top of the respective log-engaging device 26 will be a fixed predetermined distance below the location of the preliminary optimum axis on the respective end of the log when the log stops at position 14*a*. Such vertical adjustment in most cases results in the two log-engaging devices 26 being at different elevations, since the natural tapered diameter of the log causes the location of the preliminary optimum axis to be higher at one end than the other. When the conveyer 18 stops the log at the position 14*a*, the log-engaging devices 26 are extended by their respective ram assemblies 58 into positive clamping engagement with the opposing ends of the log.

Because each log-engaging device 26 has been adjusted into predetermined elevational relation with the preliminary optimum peeling axis of the log, the elevational relationship between the preliminary optimum axis and each log-engaging device 26 is fixed. Accordingly, the log-engaging devices 26 raise the log from the position 14*a* vertically upward until the devices 26 assume the same elevational relationship, with respect to the rotational axis 27 of the rotary spindles 28, that they previously assumed with respect to the prelimiary optimum axis of the log prior to engaging it. This assures that the preliminary optimum axis of the log, as determined by the preliminary scanner 24, is horizontally aligned with the rotational axis 27 of the rotary scanner spindles 28.

Likewise, the horizontal relationship between the end-engaging devices 26 and the preliminary optimum axis is fixed by the place where the conveyer 18 stopped the log at the position 14*a* relative to the devices 26. Accordingly, if the conveyer stopped the log such that the preliminary optimum axis was aligned vertically with the center of each device 26, then the respective rotary scanner spindle 28 is adjusted horizontally, in a manner to be described hereafter, so that its rotational axis is likewise vertically aligned with the center of the respective long-engaging device 26. Alternatively, if the conveyer stopped the log such that the preliminary optimum axis was offset horizontally from the center of the respective log-engaging device 26, then the respective spindle 28 is likewise adjusted horizontally so that its rotational axis 27 assumes the same offset.

The end result of these procedures is that, by virtue of the cooperation between the log-engaging devices 26 and the rotary scanner spindles 28, the log is moved by the devices 26 into a position whereby its preliminary optimum peeling axis, as determined by the scanner 24, is aligned with the rotational axis 27 of the spindles 28. Because there is no horizontal variation in the optimum peeling axis location relative to the conveyer 18 merely due to log diameter differences, as explained above, and because vertical variations in the optimum peeling axis location are accounted for by vertical adjustment of the log-engaging devices 26, the magnitude of adjustment of the spindles 28 necessary to achieve such alignment is small. This is important because the primary objective of the preliminary scanning step is to obviate the need for any large-magnitude adjusting movement of the spindles 28, thereby enabling their adjusting mechanisms to be designed exclusively for extremely fine, accurate adjustment pursuant to final scanning of the log as described hereafter.

Final Scanning

When the log has been raised to the above-described position of alignment with the rotary scanner spindles 28, such position being designated as 14*b*, the relationship of each end of the log to the respective log-engaging device 26 and associated rotary scanner spindle 28 is as shown in FIG. 3. The preliminary optimum peeling axis $C_p$ as determined by scanner 24 is aligned with the rotational axis 27 of the respective spindle 28. The respective log-engaging device 26, whose function it is to load the log into the rotary scanner spindle 28, is engaging the end of the log a predetermined distance "D" below the preliminary optimum axis $C_p$. The log-engaging portion of the rotary spindle 28 is asymmetrically offset from its rotational axis 27 and the spindle 28 is rotatably positioned so that such log-engaging portion is above the rotational axis 27. In this position, as shown in FIG. 3, each rotary spindle 28 is extended into end engagement with the log while the log remains engaged by the respective log-engaging devices 26. Such simultaneous end engagement of the log by both devices between which the log is being transferred is significant in maintaining the preliminary optimum axis $C_p$ in a known position, and is made possible by the fact that both log-engaging devices 26 and 28 are designed to engage the end of a log only within separate portions or sectors of a circular area surrounding the rotational axis 27 of the respective spindle 28.

It is further significant that the two separate end portions of the log engaged by the respective devices 26 and 28 are both spaced radially from the rotational axis 27 of the spindle 28 so as to thereby leave a circular area 62 surrounding the rotational axis 27 free of engagement by either device. This circular area is reserved for ultimate engagement of the log by the veneer lathe spindles 34. Reservation of this circular area is important because each of the log-engaging devices 26 and 28 has a series of penetrating spikes 64, 66 which create cavities in the end of the log. These cavities, if present in the end area where the lathe spindles 34 will subsequently engage the log, could cause misguidance or deflection of the log as the spindles engage its ends, thereby deflecting the optimum peeling axis out of its desired alignment with the rotational axis of the lathe 12. If the lathe is equipped with concentric outer and inner spindles, as is common, it is necessary only that the circular area 62 be large enough to contain the inner or smaller spindle since the inner spindle is the first to engage the log in the lathe and thus controls its alignment.

Figure 5:
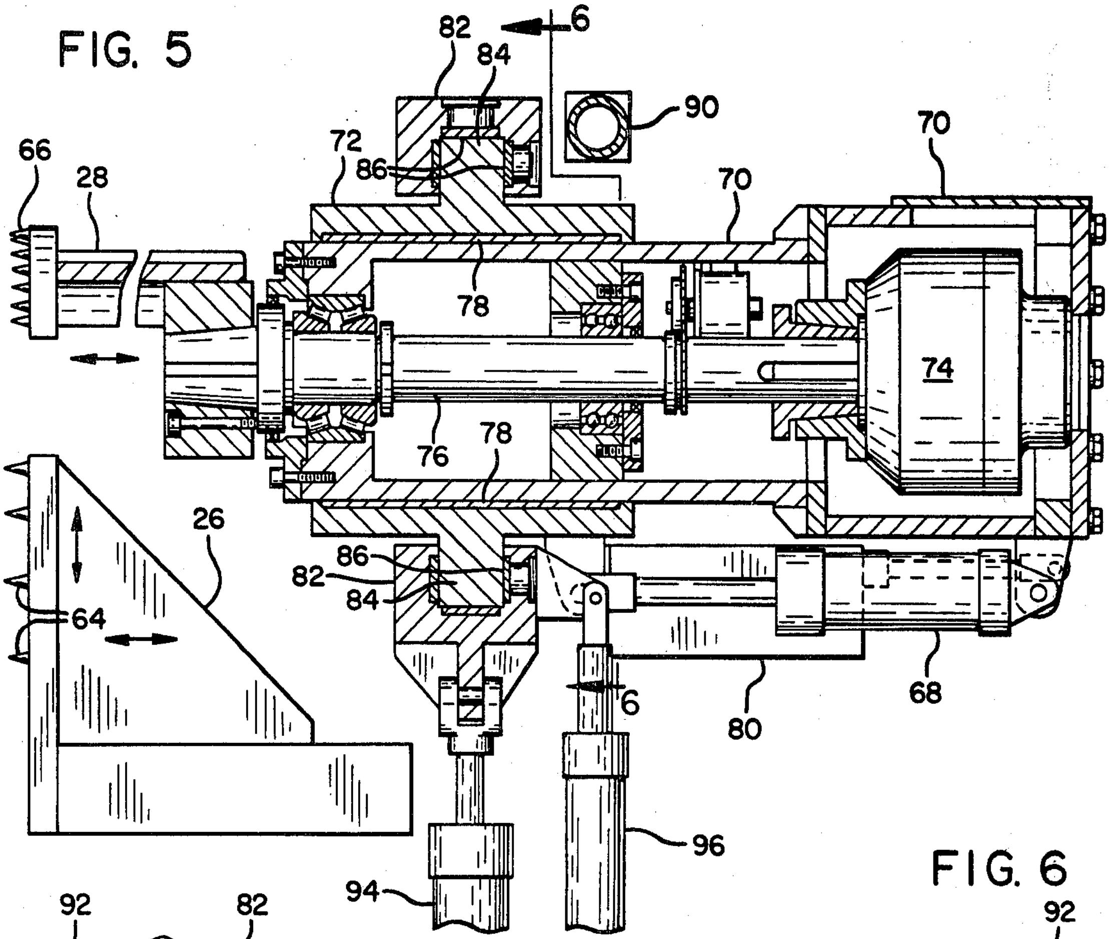
FIG. 5 is an enlarged, sectional side view of a rotary scanner spindle of the present invention.
Figure 6:
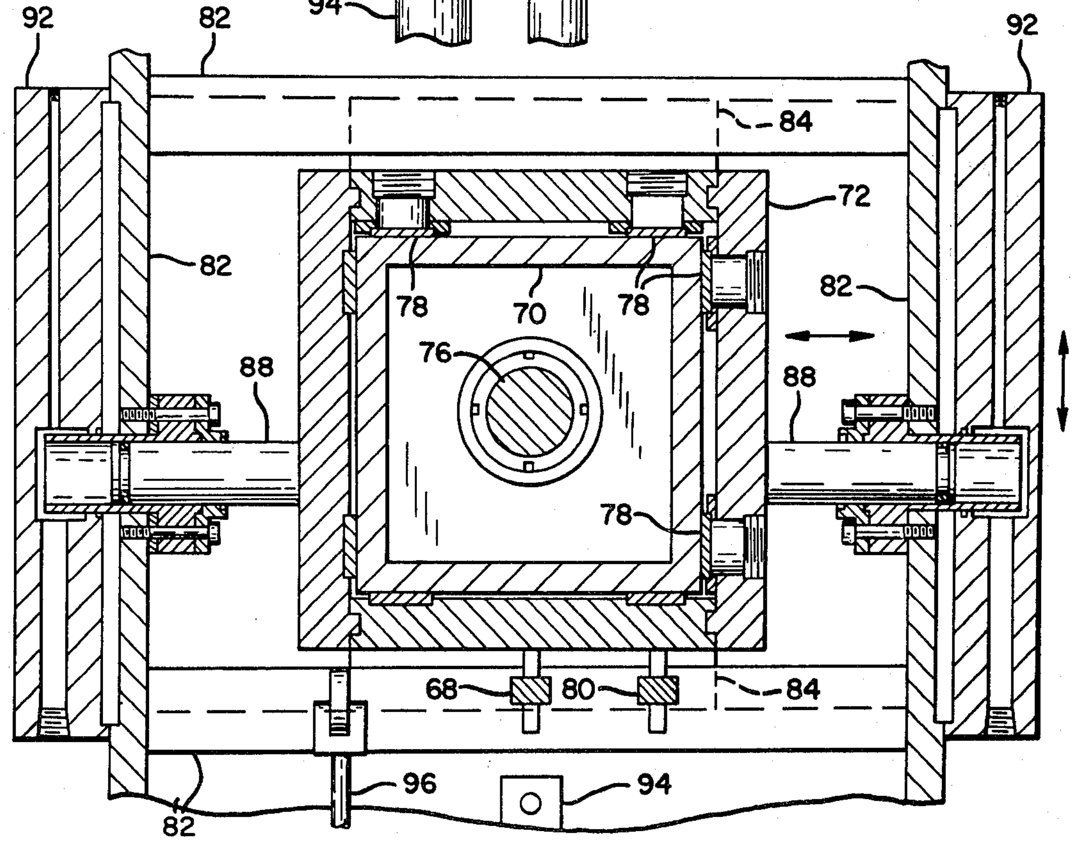
FIG. 6 is an enlarged cross-sectional view taken along line 6—6 of FIG. 5.
Figure 7:
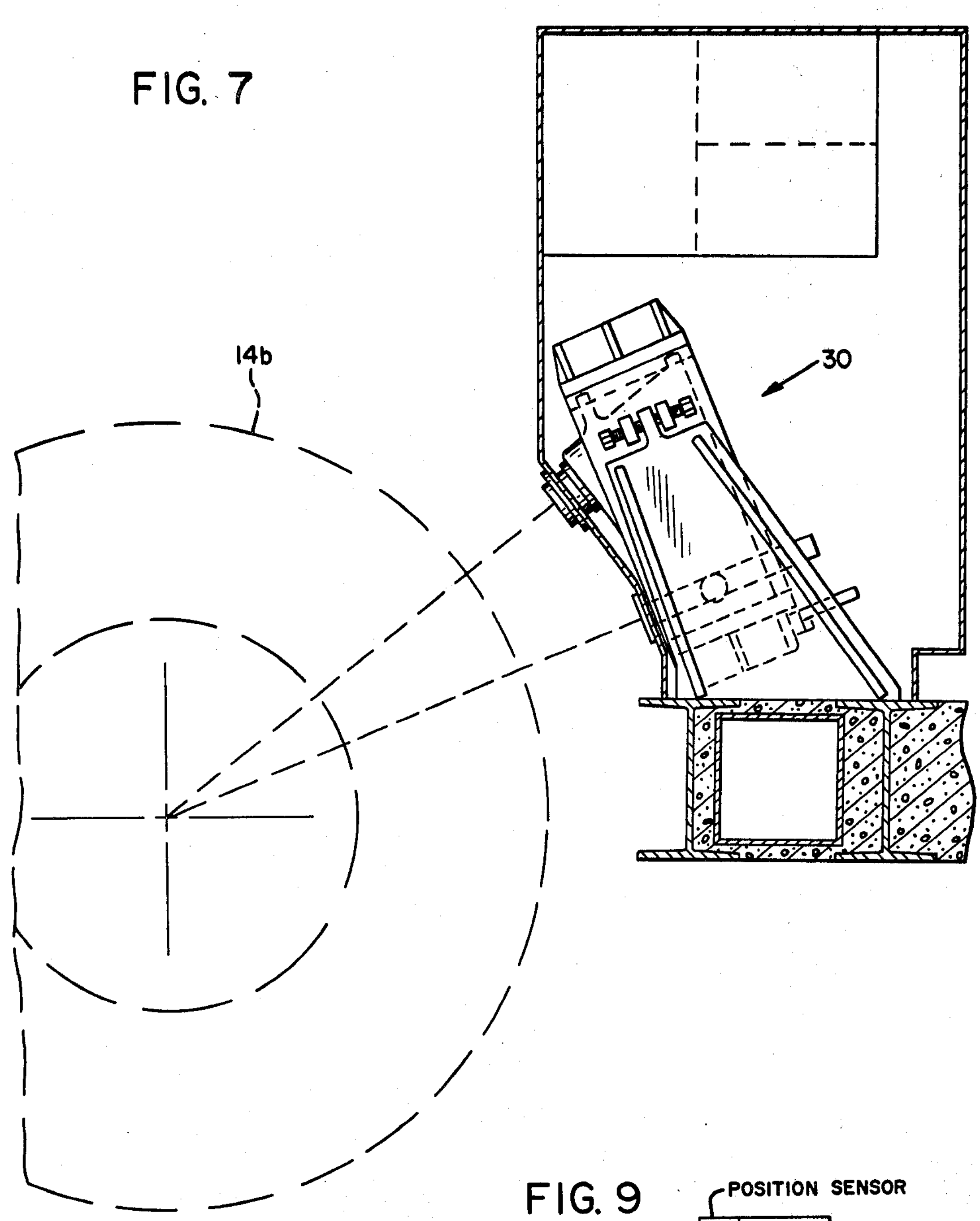
FIG. 7 is an enlarged, partially sectional view of a simplified rotary scanner suitable for use in the present invention.

FIG. 5 is a sectional side view of one of the rotary scanner spindles 28 together with its associated rotating, extending and retracting, and horizontal and vertical position adjustment mechanisms respectively. The spindle 28 is shown in FIG. 5 in the same rotational orientation, and in the same spatial relationship with respect to its associated log-engaging device 26, as is depicted in FIG. 3. Extension of the spindle 28 into engagement with the end of the log while the end is simultaneously engaged by log-engaging device 26 is accomplished by retraction of a double-acting fluid ram assembly 68 which pulls a housing 70 horizontally toward the end of the log. The housing 70, which is rectangular in cross section as best seen in FIG. 6, is slidably mounted for horizontal movement within a rectangular sleeve 72, and has a rotary hydraulic motor 74 mounted therein driving a shaft 76 which selectively rotates the spindle 28. Elongate bearing pads 78 (FIGS. 5 and 6), mounted within the sleeve 72 and biased by a predetermined fluid pressure against the housing 70, provide frictional sliding engagement between the housing 70 and the sleeve 72. Horizontal extension and retraction of the housing 70 with respect to the sleeve 72 is controlled by the hydraulic ram assembly 68 in response to a valve and controller (not shown) receiving horizontal position feedback information from a position sensor 80.

Figure 12:
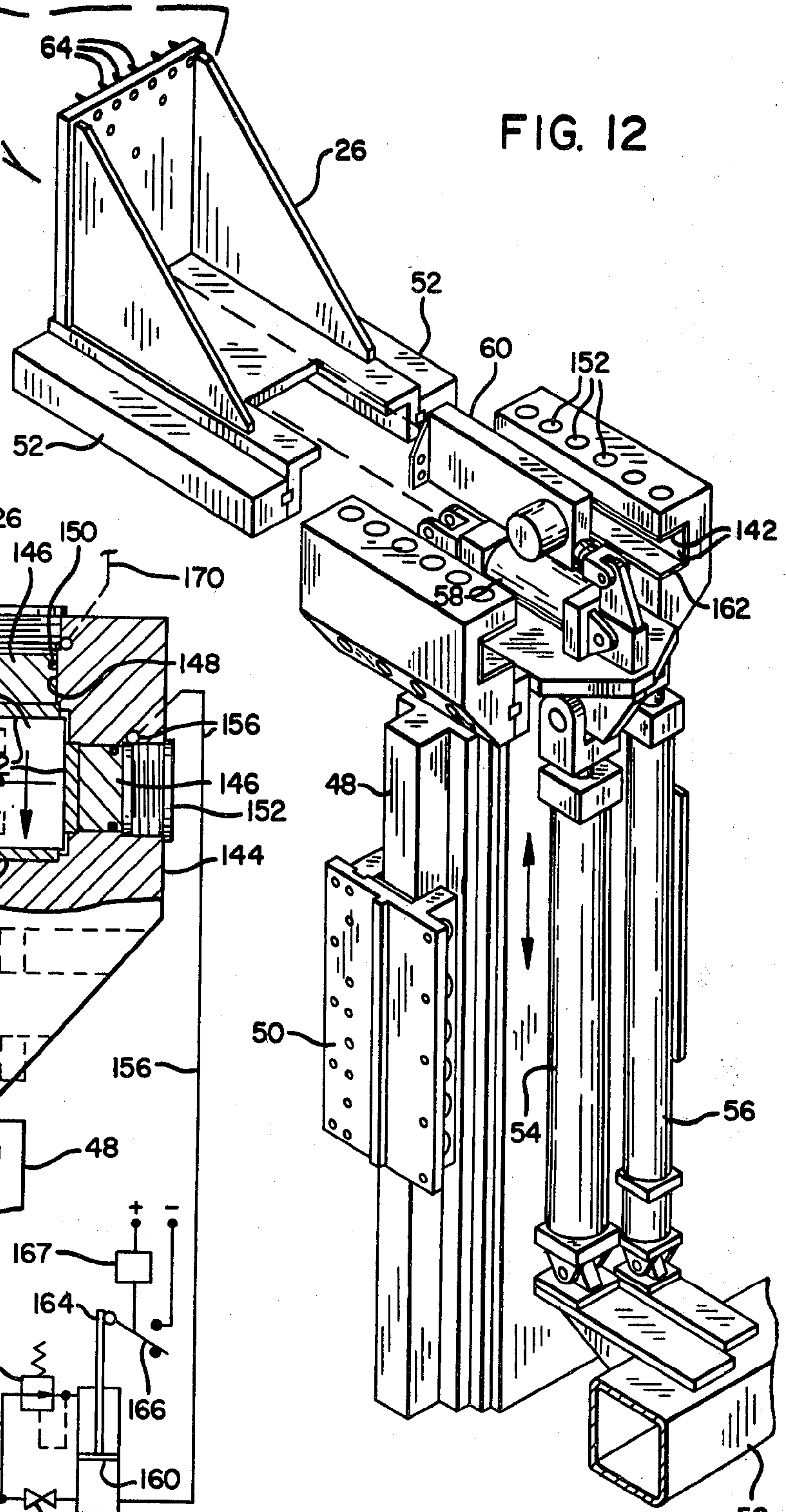
FIG. 12 is an exploded perspective view of a respective scanner loading device of the present invention.
Figure 13:
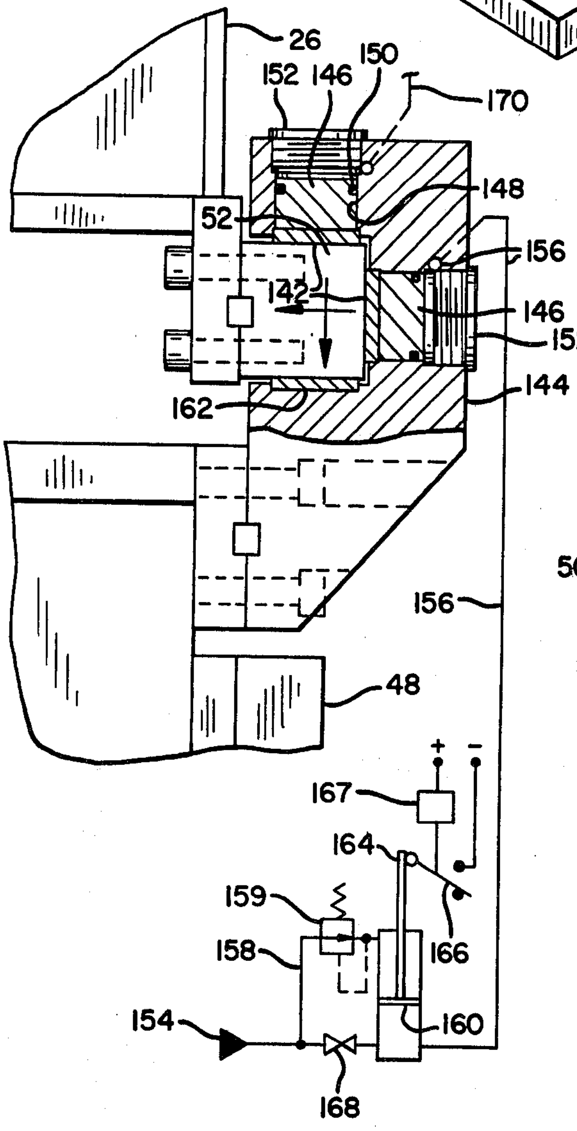
FIG. 13 is a partially schematic, partially sectional view of typical fluid pressure-biased bearing surfaces employed in the present invention, shown particularly with respect to the scanner loading device of FIG. 12.

After the spikes 66 of the rotary scanner spindle 28 have penetrated the end of the log pursuant to the extension of the housing 70 toward the end of the log, the respective log-engaging device 26 is withdrawn from the end of the log by the retraction of ram assembly 58 (FIG. 12). Thereafter each respective hydraulic motor 74 rotates its respective spindle 28, and thereby the log, through a full 360° revolution while the profile of the log is sensed, preferably at 15° increments, by the final scanner 30. Scanner 30 is a computerized electro-optical rotary scanner of any suitable known type, such as those shown in U.S. Pat. Nos. 3,852,579, 3,992,615 or 4,221,973, the disclosures of which are incorporated herein by reference. Preferably, an electro-optical system of the type shown in U.S. Pat. No. 4,221,973 is used in combination with a data processing system of the type shown in U.S. Pat. No. 3,852,579 to determine the final optimum peeling axis of the log.

After one full revolution of the log, the scanner 30 has obtained a full view of the shape thereof and has computed the final optimum peeling axis which, because of the more precise nature of the final scanner 30 compared to the preliminary scanner 24, will usually have a somewhat different position than the preliminary optimum peeling axis. Pursuant to the determination of the final optimum peeling axis of the log by the final scanner 30, the positions of the respective spindles 28 are then adjusted horizontally and vertically so as to align the final optimum peeling axis with an imaginary reference axis parallel to the rotational axis to the veneer lathe 12. The imaginary reference axis has the same spatial relationship with respect to the log-engaging ends of the transfer arms 32, when such arms are in position to receive the log from the spindles 28, as the veneer lathe's rotational axis has with respect to the arms 32 when the arms are in position to permit engagement of the log by the lathe spindles 34. Accordingly, due to adjustment of the scanner spindles 28 the final optimum peeling axis of the log, after the log is transferred by the arms 32 to the lathe spindles 34, will be aligned with the rotational axis of the lathe spindles.

Horizontal and vertical fine adjustment of the spindles 28 to align the final optimum peeling axis with the aforementioned reference axis is accomplished by means of a mechanism shown in FIG. 2 and in greater detail in FIGS. 5 and 6. Each sleeve 72 is mounted for horizontal and vertical adjustment within a rectangular frame 82. The sleeve 72 is slidable horizontally with respect to the frame 82 by means of a pair of slides 84 frictionally engaging elongate bearing pads 86. Horizontal movement of the sleeve 72 within the frame 82 is controlled by a pair of single-acting opposed hydraulic ram assemblies 88 in response to a servo valve and controller (not shown) receiving horizontal position feedback information from a horizontal position sensor 90. Vertical adjustment is permitted by vertical movement of the entire frame 82 with respect to the frame 50 of the charger, in which the frame 82 is slidably mounted for vertical movement by a pair of slides 92. Such vertical movement is controlled by a double-acting hydraulic ram assembly 94 in response to a servo valve and controller (not shown) receiving vertical position feedback information from a position sensor 96.

Although final scanning of the log is completed after one complete revolution thereof, i.e. with the spindle 28 once again in the rotary orientation shown in FIG. 3, rotation of the log by the spindles 28 is not complete at this point. Rather the spindles 28 continue to rotate the log a further fraction of a revolution until the spindle 28 of FIG. 3 assumes the rotary orientation shown in FIG. 4. During this fraction of a revolution, the above-described horizontal and vertical adjustment of the spindles 28 takes place such that, when the spindles 28 reach the rotary orientation shown in FIG. 4, the final optimum peeling axis of the log as determined by the final scanner 30 is aligned with the aforementioned imaginary reference axis. Such adjustment of the spindles 28 while the log is still being rotated eliminates an otherwise repetitive period of delay between final scanning and the transfer of the log to the lathe 12, thereby enhancing the overall production rate.

TRANSFER OF THE LOG TO THE LATHE

When the spindles 28 have rotated the log to the position depicted in FIG. 4 and have been horizontally and vertically adjusted so that the final optimum peeling axis of the log, exemplified by the designation $C_f$ in FIG. 4, is aligned with the above-identified reference axis R, the transfer arms 32 are positioned adjacent the ends of the log in a predetermined fixed spatial relation to the reference axis R. At this point the respective spindle 28 and transfer arm 32 have a relationship to one another generally as shown in FIG. 4, although it will be understood that the position of the spindle 28 relative to the transfer arm 32 will vary from log to log depending on the position of the final optimum peeling axis $C_f$ relative to the preliminary optimum peeling axis $C_p$. This is because the transfer arm 32 has a fixed, predetermined relationship only with respect to the reference axis (and thus the final optimum peeling axis $C_f$ which has been aligned with the reference axis), and not with respect to the preliminary axis $C_p$ or rotational axis 27 of the spindle 28. However, because of prescanning, the rotational axis 27 of the spindle 28 and the preliminary axis $C_p$ should not be far removed from the final optimum peeling axis $C_f$ and reference axis R.

Accordingly, in the position of FIG. 4, each transfer arm 32 is clamped into end engagement with the log while the log remains engaged by the respective rotary spindles 28. Such simultaneous end engagement of the log by both devices between which the log is being transferred has the same significance as previously discussed with respect to the transfer from the log-engaging device 26 to the rotary spindle 28, i.e. it maintains the log in a known position with respect to both devices. Such simultaneous end engagement is made possible by the fact that the rotary spindles 28 and transfer arms 32 respectively engage the end of a log only within separate portions or sectors of a circular area surrounding the rotational axis 27 of the respective spindle 28. It is further significant that the two separate end portions of the log engaged by the respective devices 28 and 32 are both spaced radially from the rotational axis 27 of the spindle 28 so as to thereby leave the aforementioned circular area 62 surrounding the rotational axis 27 free of engagement by either device. Thus this circular area remains reserved for ultimate engagement of the log by the veneer lathe spindles 34 as previously discussed.

It will also be noticed that the transfer arms 32 engage the end of the log in approximately the same area where the log-engaging device 26 (FIG. 3) previously engaged the log, i.e. in a location generally diametrically opposed to the log-engaging portion of the spindle 28. To avoid any misguidance or deflection of the log with respect to the transfer arms 32 as they engage the log due to the cavities left by the penetrating spikes 64 of the log-engaging device 26, the penetrating spikes 98 of the transfer arms 32 are arranged in a pattern substantially different from the pattern of spikes 64 so that the penetrations of spikes 98 will generally occur at different locations on the end of the log than the penetrations of spikes 64, even though both spike patterns generally cover the same end area of the log.

Figure 8:
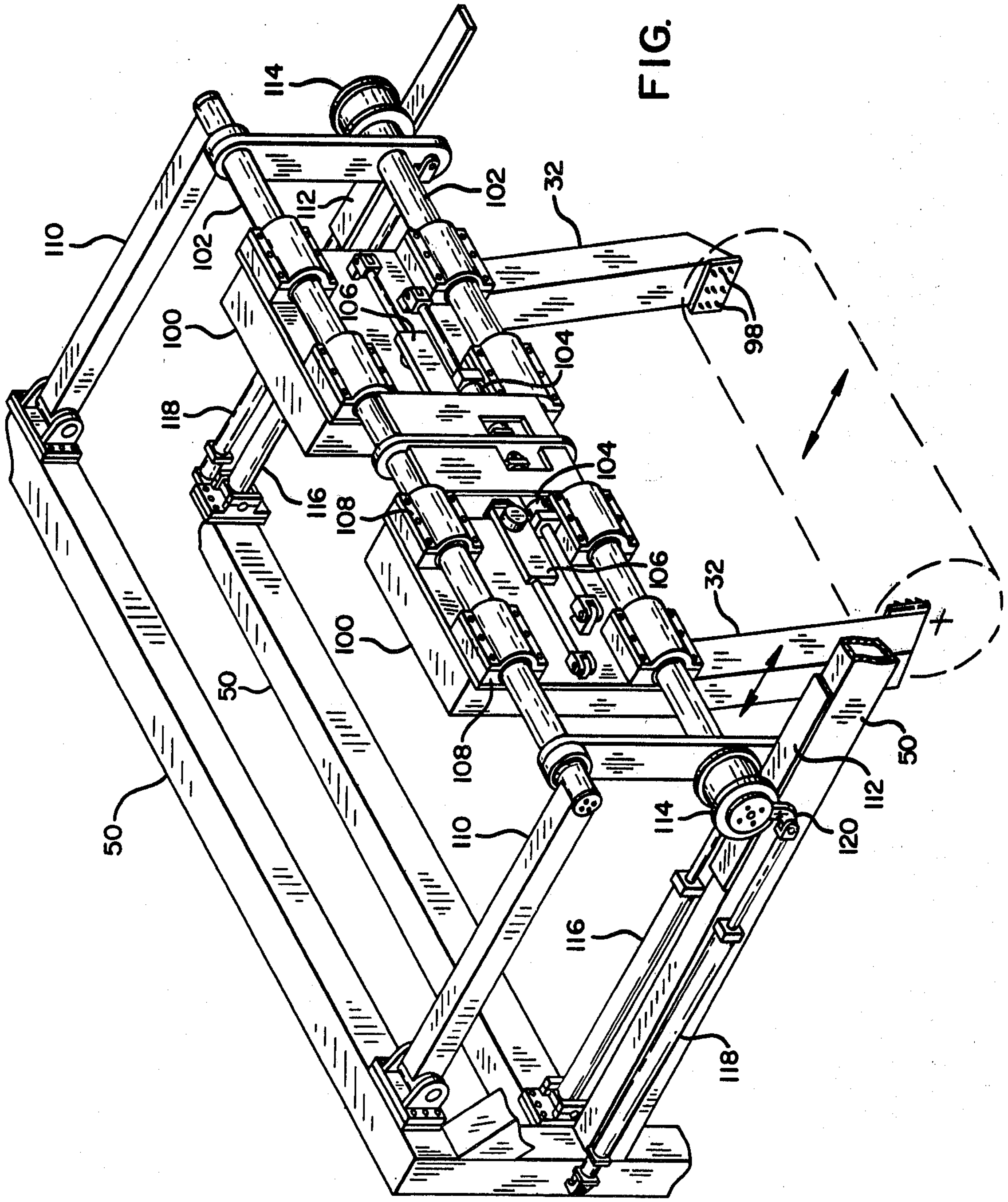
FIG. 8 is a perspective view of the log transfer device employed in the present invention.

FIG. 8 shows the actuating mechanism for the transfer arms 32. The transfer arms are reciprocated transversely into and out of end engagement with the log by virtue of the fact that each arm 32 has a respective carriage 100 at its upper end both pivotal and transversely slidable with respect to a pair of transverse rods 102. Transverse sliding of the carriages 100 toward or away from one another alternatively to engage or release the ends of a log is controlled by a pair of double-acting hydraulic ram assemblies 104 in response to valves and controllers (not shown) receiving transverse position sensing feedback information from respective position sensors 106. With the transfer arms 32 positioned as shown in FIG. 4, ram assemblies 104 are simultaneously retracted pulling the carriages 100 and thus the arms 32 toward one another into end-engaging relationship with the log. After the penetrating spikes 98 of the transfer arms 32 have penetrated the opposing ends of the log, the rotary scanner spindles 28 are each retracted by extension of ram assembly 68 and the resultant retraction of housing 70 out of engagement with the log, thereby leaving the log solely within the grasp of the transfer arms 32.

FIGS. 2 and 8 show the mechanism by which the transfer arms 32 reciprocate in unison between the rotary scanner spindles 28 and the lathe spindles 34, so as to transfer the log to the lathe. The entire transfer arm mechanism 32 is supported by the charger frame 50. The upper end of each arm 32 (i.e. the upper end of each arm's carriage 100) is pivotally and transversely slidably connected to the upper rod 102 by bushings 108. The upper rod 102, rather than being affixed immovably to the frame 50, is vertically movable with respect to the frame 50 by virtue of its connection to the ends of a pair of idler arms 110 which are pivotable vertically with respect to the frame 50. The vertical support for the arms 32 is thus not provided by the idler arms 110, but rather by the supportive interaction between a pair of tracks 112 on the frame 50 and a pair of rollers 114 rotatably connected to the ends of the lower rod 102.

The arms reciprocate between the rotary scanner and the lathe in unison under the control of a pair of double-acting hydraulic ram assemblies 116 in response to servo valves and controllers (not shown) receiving position sensing feedback information from a pair of position sensors 118. Each position sensor 118 is connected by a respective crank arm 120 to an end of the lower rod 102 so that the connections between the position sensors 118 and the crank arms 120 correspond geometrically to the connections between the ram assemblies 116 and the lower rod 102. Because of the provision of the supporting tracks 112 and the vertically movable pivotal connection between the arms 32 and the upper rod 102, it will be recognized that the upper ends of the arms 32 not only pivot but also move vertically while the arms reciprocate between the final scanner spindles 28 and the lathe 12. This arrangement has the advantage of both elevating and straightening the path of a log as it is transferred from the final scanner to the lathe without a requirement for raising the position of the upper pivot point (about the upper rod 102) to as high an elevation as would be required if the upper pivot point were fixed. This makes the transfer arm structure substantially more compact than it would otherwise be if it utilized a pure pivoting geometry, allowing installation in structures having lower overhead clearance, while permitting sufficient clearance beneath the transfer path of a log to permit the advantageous utilization of a transverse log ejection conveyor 32 without interference with a log being transferred by the conveyor 42. While the tracks 112 are rectilinear for sake of simplicity and economy, it would be possible to design such tracks with a curved or otherwise irregular shape so as to further straighten and elevate the path of transfer of a log from the final scanner to the lathe if such result were desired. Alternatively, controlled vertical movement of the upper ends of the arms 32 to straighten and elevate the path of transfer of the log could be achieved without any tracks 112 at all by providing fluid ram assemblies and associated position sensors interacting between arms 110 and the frame 50 to control the vertical pivoting movement of arms 110 and thus the vertical movement of the upper ends of the arms 32. In such case, arms 110 would provide the vertical support for the arms 32.

After the arms 32 have grasped the opposing ends of a log and such ends have thereafter been released by the rotary scanner spindles 28, ram assemblies 116 begin extending so as to transfer the log toward the lathe 12. When the arms 32 have brought the log to within a predetermined distance of the rotational axis of the lathe, where there is not yet any danger of the log interfering with a preceding log being peeled by the lathe 12, the controllers of the servo valves which operate the ram assemblies 116 begin to receive input information regarding the position of the peeling knife 36 of the lathe 12 as it peels the preceding log. Such knife position is sensed by a position sensor 122 (FIG. 1), of either the rotary encoder type as shown or of the linear type, connected to the ball screw 40 which controls the reciprocating movement of the knife blade 36 toward and away from the rotational axis of the lathe. The continued movement of the arms 32 and their engaged log toward the rotational axis of the lathe 12 is thereafter responsive and proportional to the simultaneous movement of the knife blade 36 toward the rotational axis of the log, thereby enabling the log grasped by the arms 32 to move gradually closer to the lathe as the diameter of the preceding log becomes smaller as a result of peeling. When peeling of the preceding log is finally completed, the log held by the transfer arms 32 has already moved into very close proximity with the rotational axis of the lathe 12. At this point the lathe spindles 34 are retracted, dropping the remnant of the preceding peeled log onto the conveyer 42. However the log held by the transfer arms 32 cannot yet be positioned for peeling because the peeling knife 36 must be retracted. Rather than waiting for such retraction before beginning to move the log into proper peeling position, however, the controllers of the servo valves of the ram assemblies 116 cause further gradual movement of the log toward the lathe in response and proportion to the retracting motion of the knife 36, as also sensed through the position sensor 122. Accordingly, by the time the peeling knife 36 has been fully retracted, the transfer arms 32 have brought the log into proper peeling position with its final optimum peeling axis aligned with the rotational axis of the lathe spindles 34. The spindles 34 then engage the log, the transfer arms 32 release it, and the peeling knife 36 is advanced in the conventional manner toward the rotational axis of the spindles 34 as the log is rotated by the spindles 34. Meanwhile the transfer arms 32 are retracted, by the retraction of the ram assemblies 116, back toward the rotary scanner spindles 28 so as to engage the next log in the manner previously described.

CALIBRATION

A continued high degree of accuracy of the charger 10 in its manipulation and alignment of logs is ensured by the ability of the system for self-calibration of the rotary scanner 30 and its related adjusting mechanisms. This is accomplished by peeling a log, which has been scanned and properly aligned in the lathe in accordance with the abovedescribed procedures, to a known diameter and then, rather than ejecting the remnant of the peeled log, manually or automatically controlling the operation of the transfer arms 32 to recover the remnant from the lathe spindles 34 and return the remnant to the rotary scanner spindles 28 for redetermination by the scanner 30 of the remnant's optimum peeling axis. Accurate calibration and functioning of the charger is indicated by the lack of need for any readjustment in the position of the peeled remnant to realign its optimum peeling axis, as determined by rescanning, with the reference axis. If any such adjustment is required, a conventional display indicates the degree of adjustment and thus the degree of inaccuracy which must be corrected by recalibration, repair or adjustment as required.

SYSTEMS RELATING TO LONGITUDINAL DIMENSION OF LOG

Certain systems are incorporated in the charger 10 which relate to the longitudinal positioning and control of each log rather than to its optimum peeling axis. These systems primarily enhance the production rate of the charger and lathe.

When each log 14 is deposited from the conveyer 16 onto the conveyer 18, a pair of arms 22 actuated by a pair of fluid ram assemblies, having associated position sensors, servo valves and controllers (not shown), grasp the ends of the log to sense its length while simultaneously shifting it longitudinally such that one of its ends (i.e. its controlled end) is flush with an imaginary line extending parallel to the edge of the conveyer 18.

The length sensing information derived from the positions sensors of arms 22 is utilized by the charger in a number of different ways. First, logs too short or too long for veneer peeling are immediately identified and can be discarded from the conveyer 18 onto the ejection conveyer 42 either automatically or by operator manual override so that no time is lost scanning these logs and transferring them to the lathe. Second, the length information is compared with the subsequent positions of the log-engaging devices 26, rotary scanner spindles 28 and transfer arms 32 as they extend toward each other to engage the log to determine the exact time when full engagement of the log is achieved by each set of log manipulators. Such full engagement can be sensed as the time when the space between opposing manipulators, as indicated by their position sensors, equals the known length of the log. At this point, the manipulators are automatically actuated to begin to move the log according to their predetermined functions without the need for any delay to provide a margin of safety to ensure full engagement. Also, by comparing the known log length with the subsequent engagement positions of the respective sets of log manipulators, it can be determined whether any set of manipulators has, in fact, engaged the log. For example if the signals from position sensors 60, 80 or 106, at the time that their respective log manipulators are supposed to be engaging a log of known length as sensed by the arms 22, indicate that their respective manipulators have closed to positions separated by less than the known length of the log, such discrepancy indicates that the log has not been grasped for some reason. Accordingly such discrepancy is indicated automatically by any suitable means to bring the problem to the attention of the operator, preferably by interrupting extension and actuation of the set of manipulators automatically in response to such discrepancy to permit the operator to manually control the appropriate log manipulators to correct the problem.

As mentioned above, besides length-sensing, the arms 22 have the further function of positioning one end (the controlled end) of each log along a predetermined imaginary line parallel to the edge of the conveyer 18. Subsequent log-engaging devices 26, 28 and 32 which subsequently engage the same end of the log likewise are controlled, by their respective fluid ram assemblies, position sensors, valves and controllers, so as to limit their extension to positions for maintaining such end of the log flush with such imaginary line. This ensures that the controlled end of the log, when ultimately mounted in peeling position in the lathe 12, retains its alignment with such imaginary line. The object of such longitudinal log position control is to ensure that the controlled end of each log longitudinally overlaps outwardly, and thus engages, one of the scoring knives 123 (FIG. 1) conventionally positioned adjacent each end of the lathe's peeling knife 36, such knives serving to form the longitudinal edges of the veneer sheets peeled from the log. This feature, in cooperation with the detection by arms 22 of logs of insufficient length and the resultant ejection of such logs from the charger, ensures that both ends of each log extend outwardly beyond the scoring knives when the log is in peeling position. Without such longitudinal log position control the operator would have to check visually the positions of the two scoring knives relative to each log, and then longitudinally adjust the position of the log in the lathe if the ends of the log did not overlap both scoring knives, prior to beginning the peeling operation.

In summary, the foregoing interaction between the length-sensing and longitudinal positioning arms 22 and the subsequent log manipulators 26, 28 and 32 serves to eliminate numerous time delays which would otherwise be repeated on a regular basis as logs are processed.

LOG MANIPULATOR POSITIONING SYSTEMS

Figure 9:
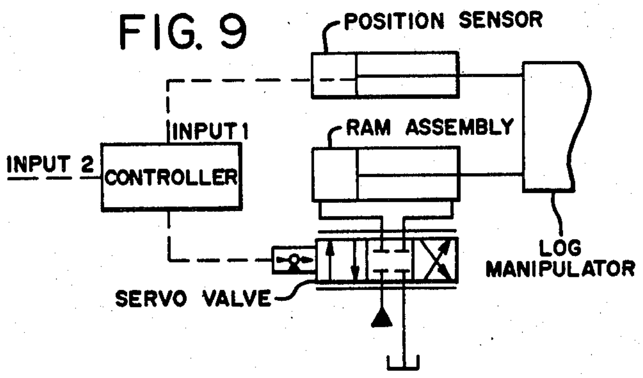
FIG. 9 is a schematic diagram of an exemplary fluid ram assembly and its associated position sensor, servo valve and controller of the type utilized with each of the various log manipulators of the present invention.

FIG. 9 depicts schematically a typical doubleacting hydraulic ram assembly and its associated position sensor, servo valve and controller employed to control virtually all of the log manipulators of the charger 10. In particular, the diagram of FIG. 9 is typical of the system utilized for the following ram assemblies and position sensors (except that items 2, 3 and 6 below actually employ solenoid-operated valves rather than servo valves):

1. ram assembly 54 and position sensor 56 of log-engaging device 26;

2. ram assembly 58 and position sensor 60 of log-engaging device 26;

3. ram assembly 68 and position sensor 80 for extending and retracting each rotary scanner spindle 28;

4. ram assemblies 88 and position sensor 90 for horizontally adjusting the position of each rotary scanner spindle 28;

5. ram assembly 94 and position sensor 96 for vertically adjusting the position of each rotary scanner spindle 28;

6. ram assemblies 104 and position sensors 106 for controlling the clamping and unclamping of transfer arms 32; and 7. ram assemblies 116 and position sensors 118 for controlling the log transfer movement of transfer arms 32.

In general, the reciprocating motion of each ram assembly, and the resultant movement of each log manipulator to which the ram assembly is connected, is controlled by a servo valve which admits hydraulic fluid selectively to either side of the ram assembly's piston depending upon the position of the spool of the servo valve. The position of the valve spool depends upon signals received from a controller in response to the controller's comparison of two input signals. The first input signal comes from the position sensor connected to the particular log manipulator being controlled. The position sensor, which operates on a conventional principle to be described hereafter, is a precision position measuring device which continually follows the movement of the log manipulator and transmits a signal which changes incrementally with changes in position so that the controller can sense the precise relative position of the log manipulator. The controller's second input signal is from a system for determining the desired position of the log manipulator. For example, in the case of ram assembly 54, the second input signal is from the preliminary scanner 24. Alternatively, in the case of ram assemblies 88 and 94, the second input signal is from final scanner 30. In the case of ram assemblies 116, the second input signal would be from peeling knife position sensor 122. For ram assemblies 58, 68 and 104 on the controlled end of the log, the second input signal would represent the predetermined position of the controlled end.

When the controller, in comparing the actual position signal (input 1) with the desired position signal (input 2), determines that extension of the ram assembly is required to move the log manipulator to the desired position, it moves the servo valve spool toward the right as shown in FIG. 9. Conversely, when it senses that retraction of the ram assembly is required to move the log manipulator to the desired position, it moves the servo valve spool toward the left. When its comparison of the two inputs indicates that the log manipulator is in the desired position, it centers the servo valve spool. The controller makes such comparison repeatedly in rapid succession to ensure that the particular log manipulator is moved to, and then maintained in, its desired position.

The controller's second input signal can, in some cases, also constitute a reference signal. For example, in the case of ram assemblies 58, 68 and 104 on the uncontrolled end of the log, the second input signal would represent log length-sensing information from the position sensors of arms 22 which the controller compares with the signal from the respective position sensor 60, 80 or 106 to determine whether complete engagement or nonengagement, as the case may be, has occurred.

It is important to note that the fluid ram assemblies which act as the power actuators for the various log manipulators do not also serve as position sensors for their respective log manipulators, as is the common practice with comparable positioning systems. Instead, each position sensor is a separate unit connected to the log manipulator separately and independently of the connection of the ram assembly. Thus the wear which occurs at the connection between each ram assembly and its respective log manipulator due to the transfer of substantial force therethrough does not affect the separate connection of the respective position sensor to the same log manipulator, and therefore the position sensors retain their high degree of accuracy. Since positioning accuracy depends principally upon the accuracy of the position sensors rather than the ram assemblies, the accuracy of the positioning system remains high. Moreover, the maintained accuracy of the position sensors enables them to detect excessive wear in their associated ram assembly connections as indicated by excessive overshooting of a desired position, and the resultant necessity for excessive position correction. Such overshooting is recorded on a printout or display thereby identifying the location of the wear.

Figure 10:
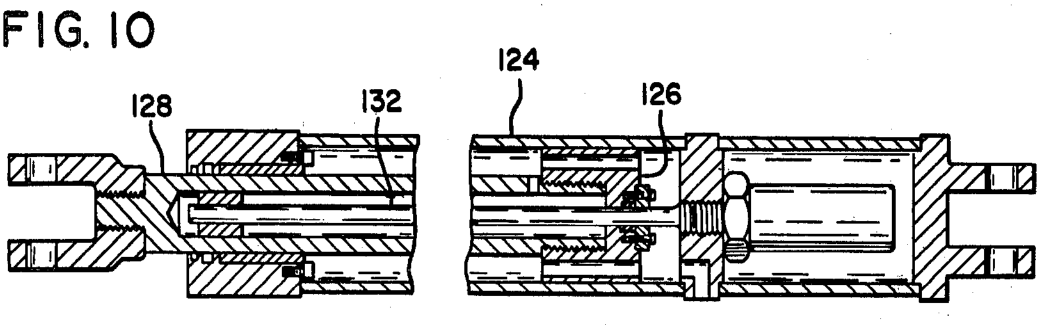
FIGS. 10 and 11 are enlarged sectional views of respective position-sensing devices for the various log manipulators of the present invention.
Figure 11:
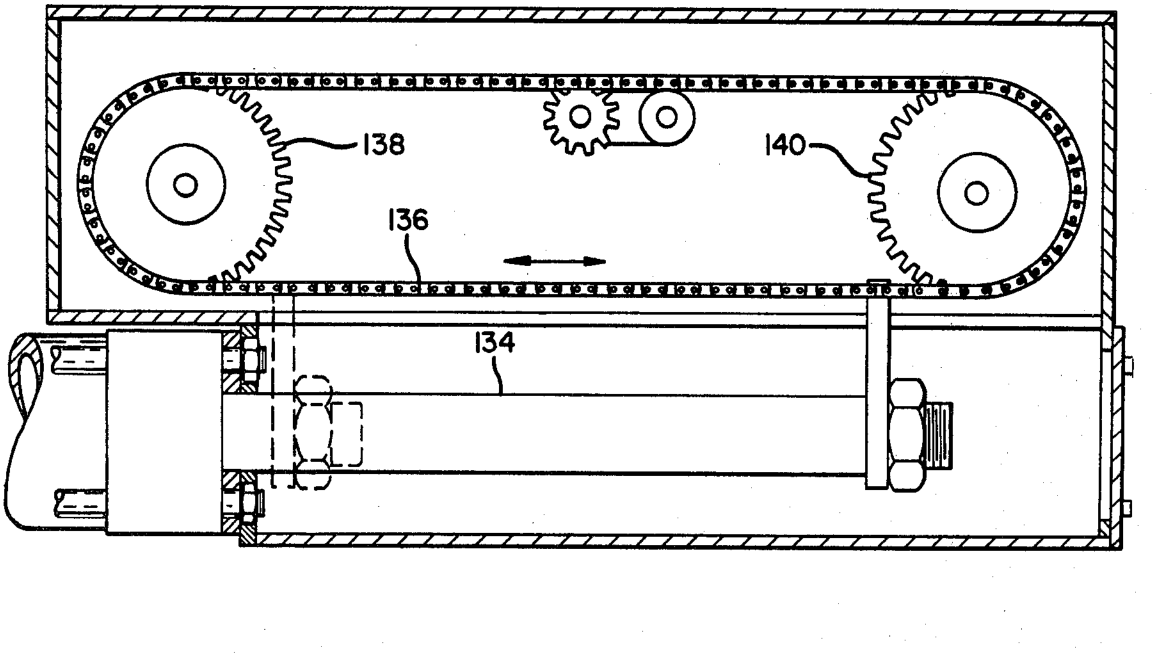

FIGS. 10 and 11 depict two different types of conventional position sensors utilized in the present invention. FIG. 10 shows a linear position-sensing device having an oil-filled cylinder 124 within which a piston 126 and piston rod 128 reciprocate in response to the movement of the object whose position is to be sensed, to which the piston rod 128 is connected. The piston 126 has a permanent magnet therein and surrounds an elongated nonmagnetic beam 132. The principle of operation of the position sensor of FIG. 10 is fully disclosed in U.S. Pat. No. 3,898,555, which is incorporated herein by reference. Position sensors 56, 90, 96 and 118 are constructed in accordance with FIG. 10.

The position sensor of FIG. 11 comprises a reciprocating rod 134 connected to the manipulator whose position is to be sensed. Movement of the rod 134 in response to movement of the manipulator causes movement of a chain 136 to which the rod 134 is attached. Movement of the chain 136 in turn rotates a rotary encoder connected to either of sprockets 138 or 140 as the case may be. The rotary encoder generates signals in a known manner which vary with the degree of rotation of the encoder as determined by the position of the manipulator. Position sensors 60, 80, and 106 are constructed in accordance with FIG. 11.

PRESSURE-BIASED BEARING SYSTEM

A further important feature which reduces the effect of wear upon the accuracy of the charger is the provision of fluid pressure-biased bearing pads for those log manipulators which precisely adjust the position of the log for proper alignment of its optimum peeling axis. These include those bearing pads, such as 78 and 86, associated with each rotary scanner spindle 28 abutting the various slidable elements thereof by which the spindle is extended and retracted and adjusted horizontally and vertically. Also included are the bearing pads which guide the vertical slides 48 and horizontal slides 52 of the respective log-engaging devices 26.

For purposes of illustration, pressure-biased bearing pads 142 which guide horizontal slides 52 of each log-engaging device 26 will be explained in detail as typical of all of the pressure-biased bearing pads. Each such elongate bearing pad is movably mounted within a slide guide frame 144 so as to be movable toward the slide in a direction transverse to the sliding direction thereof. Behind each bearing pad 142 is a row of pistons 146, each slidably mounted in a bore 148 and sealed by a U-cup 150. Behind each piston 146 is a fluid cavity formed between the piston and a respective threaded plug 152. Each bore of a respective row of pistons 146 communicates with a source of pressurized hydraulic fluid 154 through a respective conduit 156. The pressure of the fluid in conduit 156 exerts a predetermined fluid pressure on the respective pistons 146, which in turn is transferred to the respective bearing pad 142 and slide 52. The predetermined fluid pressure is determined by the pressure of the fluid source 154 exerted through a conduit 158 and pressure reducing valve 159 upon the side of a respective piston 160 having the lesser area of its two sides. Thus the pressure actually exerted through conduit 156 on the pistons 146 is somewhat less than the pressure at the source 154 in accordance with the setting of the pressure reducing valve 159 and the ratio of the areas of the two sides of the piston 160.

As natural wear to the respective bearing pad 142 occurs, it nonetheless continues to exert the same pressure upon the slide 52 and no looseness in the engagement of the slide with the slide guide frame 144 is thereby permitted to occur. It will be noted that, in order to prevent such looseness, it is not necessary to provide pressure-biased bearing pads in opposing relationship to each other; rather a fixed bearing pad such as 162 can oppose a pressure-biased bearing pad such as 142. As wear of the respective bearing pad 142 occurs, both the rear side of the bearing pad and the pistons 146 move toward the slide 52 thereby permitting more pressurized fluid to enter the cavities behind the pistons 146. Such fluid is drawn from the large area side of the piston 160 causing some small retraction of the piston 160 and its associated piston rod 164.

No significant retraction of the piston and rod will occur, however, unless there is leakage of fluid past the pistons 146. In such event the relative extension of the rod 164 serves as an indicator for sensing flow of pressurized fluid into the cavities and thus leakage. Before the piston 160 becomes fully retracted due to loss of fluid due to leakage, the retraction of the piston rod 164 closes an electrical switch 166 which actuates an appropriate alarm or printout 167 to signal the impending loss of fluid pressure on the respective bearing pad 142. Such signal enables the operator to open a valve 168 so as to allow fluid to flow from the fluid source 154 to the large area side of the piston 160. Because of the area difference on the two sides of the piston 160, such opening of the valve 168 causes the piston 160 and piston rod 164 to extend so as to replenish the fluid on the large area side of the piston 160. Full extension of the piston 160 reopens switch 166. Opening of valve 168 could alternatively be automatic in response to switch 166 if desired. In this manner leakage can easily be detected from the relative extension of the piston rod 164 before the reduction of fluid pressure on the pad 142, thereby permitting repair of the system before any harm is done.

Preferably the pistons 146 of each pressure-biased bearing pad 142 are connected by their own separate conduit, such as conduits 156 and 170, to their own separate piston 160, switch 166 and valve 168 so that the pressure exerted on each pad can be set and any leakage thereof monitored and pinpointed separately.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A charger for a veneer lathe comprising:

(a) log engagement means for engaging opposing ends of an elongate log, said log engagement means including rotary means for rotating said log longitudinally about an axis of rotation, said log engagement means being positioned asymmetrically with respect to said axis of rotation of said rotary means so as to engage each of said opposing ends of said log only within a first portion of a circular area surrounding said axis of rotation of said rotary means and thereby leave a second portion of said circular area free of said log engagement means;

(b) final scanning means for sensing the shape of said log while it is engaged by said log-engagement means for determining the location of the longitudinal axis of the log for optimum production of veneer;

(c) transfer means for transferring said log from said log-engagement means to a position wherein said longitudinal axis of said log is aligned with the rotational axis of said veneer lathe;

(d) preliminary scanning means for sensing the shape of said log for determining the location of a preliminary longitudinal axis of said log for optimum production of veneer;

(e) final scanner loading means responsive to said preliminary scanning means for transferring said log from said preliminary scanning means to a position wherein said preliminary longitudinal axis of said log is in a predetermined alignment with respect to said log engagement means; and said scanner loading means including means for engaging each of said opposing ends of said log within said second portion of said circular area while said ends are simultaneously engaged by said log engagement means within said first portion of said circular area.

2. The apparatus of claim 1 wherein said veneer lathe has rotary spindle means for engaging each of said opposing ends of said log, said first and second portions of said circular area being spaced radially from said axis of rotation of said rotary means so as to leave a second circular area, concentric with and smaller than the first circular area, free of engagement by either said log engagement means or said scanner loading means, said second circular area being sufficiently large to enable said rotary spindle means to engage said ends of said log within said second circular area.

3. The apparatus of claim 1 wherein said transfer means includes means for engaging each of said opposing ends of said log within said second portion of said circular area while said ends are simultaneously engaged by said log engagement means, said transfer means and said scanner loading means having respective penetrating means for engaging and penetrating said ends of said log, said respective penetrating means having different configurations from each other such that they avoid penetrating said ends of said log in identical locations.

4. A charger for a veneer lathe comprising:

(a) log-engagement means for engaging opposing ends of an elongate log;

(b) final scanning means for sensing the shape of said log while it is engaged by said log engagement means for determining the location of the longitudinal axis of the log for optimum production of veneer;

(c) tranfer means for transferring said log from said log-engagement means to a position wherein said longitudinal axis of said log is aligned with the rotational axis of said veneer lathe;

(d) preliminary scanning means for sensing the shape of said log for determining the location of a preliminary longitudinal axis of said log for optimum production of veneer;

(e) final scanner loading means responsive to said preliminary scanning means for transferring said log from said preliminary scanning means to a position wherein said preliminary longitudinal axis of said log is in a predetermined alignment with respect to said log engagement means; and (f) generally V-shaped supporting surface means for supporting said log intermediate the ends thereof while the shape of said log is being sensed by said preliminary scanning means, said V-shaped supporting surface means forming a predetermined included angle within which said log is supported;

(g) said scanner loading means includes means for engaging said opposing ends of said log and transferring said log from said V-shaped supporting surface means toward said log engagement means along a rectilinear path substantially bisecting said included angle.

5. The apparatus of claim 4 including conveyer means having said V-shaped surface means mounted thereon for moving said log transversely away from said preliminary scanning means while supporting said log on said V-shaped surface means.

6. A method for charging a veneer lathe comprising:

(a) scanning the shape of an elongate log with a first scanner and determining the location of a preliminary longitudinal axis of said log for optimum production of veneer;

(b) engaging the opposing ends of said log with a loading device and moving said log by means of said loading device to a position wherein said preliminary longitudinal axis of said log is in a predetermined alignment with respect to a log-engaging device;

(c) engaging the opposing ends of said log with said log-engaging device while said log is in said position and while said ends are simultaneously engaged by said loading device;

(d) scanning the shape of said log with a second scanner while said log is engaged by said log-engaging device and determining the location of a final longitudinal axis of said log for optimum production of veneer; and (e) transferring said log from said log-engaging device to a position wherein said final longitudinal axis of said log is aligned with the rotational axis of said veneer lathe.

7. The method of claim 6 wherein said step (d) includes rotating said log longitudinally about an axis of rotation by means of said log-engaging device while engaging each of said opposing ends of said log only within a first portion of a circular area surrounding said axis of rotation so as to thereby leave a second portion of said circular area free of engagement by said log-engaging device, said step (b) including engaging each of said opposing ends of said log with said loading device within said second portion of said circular area.

8. The method of claim 7 wherein said first and second portions of said circular area are spaced radially from said axis of rotation so as to leave a second circular area on each of said ends, concentric with and smaller than the first circular area, free of engagement by either said log-engaging device or said loading device, further including engaging each of said ends of said log with said veneer lathe within said second circular area.

9. The method of claim 7 wherein said step (b) includes engaging each of said opposing ends of said log with said loading device by penetrating said ends of said log within said second portion of said circular area, and wherein said step (e) includes penetrating each of said opposing ends of said log also within said second portion of said circular area in locations different from those at which penetration occurs in said step (b).

10. A method for charging a veneer lathe comprising:

(a) scanning the shape of an elongate log with a first scanner and determining the location of a preliminary longitudinal axis of said log for optimum production of veneer;

(b) moving said log from said first scanner to a position wherein said preliminary longitudinal axis of said log is in a predetermined alignment with respect to a log-engaging device by supporting said log intermediate the ends thereof in a generally V-shaped supporting surface having a predetermined included angle within which said log is supported, engaging said opposing ends of said log with a loading device and moving said log from said V-shaped supporting surface along a rectilinear path substantially bisecting said included angle;

(c) engaging the opposing ends of said log with said log-engaging device while said log is in said position;

(d) scanning the shape of said log with a second scanner while said log is engaged by said log-engaging device and determining the location of a final longitudinal axis of said log for optimum production of veneer; and (e) transferring said log from said log-engaging device to a position wherein said final longitudinal axis of said log is aligned with the rotational axis of said veneer lathe.

11. The method of claim 10 wherein said step (b) includes moving said log transversely toward said loading device by means of a conveyor having said V-shaped surface mounted thereon.

* * * * *

UNITED STATES PATENT AND TRADEMARK OFFICE

CERTIFICATE OF CORRECTION

PATENT NO. : 4,398,580

DATED : August 16, 1983

INVENTOR(S) : Fred Sohn and Kenneth L. Shrum

It is certified that error appears in the above-identified patent and that said Letters Patent is hereby corrected as shown below:

Col. 1, line 45 Change "descrepancy" to --discrepancy--.

Col. 1, line 51 Change "process" to --progress--.

Col. 16, line 44, at the beginning of the sub paragraph insert -- (f) --.

Signed and Sealed this

*Eighth* Day of *November 1983*

[SEAL]

*Attest:*

GERALD J. MOSSINGHOFF

*Attesting Officer* *Commissioner of Patents and Trademarks*